US006397457B1

(12) United States Patent
Wuyts

(10) Patent No.: US 6,397,457 B1
(45) **Date of Patent: *Jun. 4, 2002**

(54) APPARATUS FOR REMOVING A CONNECTOR FROM A PRINTED CIRCUIT BOARD

(75) Inventor: Robert A. Wuyts, Antwerp (BE)

(73) Assignee: Framatome Connectors International, Courbevoie (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,034

(22) Filed: Nov. 10, 1998

(30) Foreign Application Priority Data

Nov. 12, 1997 (BE) ............................................ 9700906

(51) Int. Cl.7 .......................... B23P 19/04; B23P 19/00

(52) U.S. Cl. .......................... 29/762; 29/764; 29/426.5; 29/33 M; 29/251; 29/283; 140/147; 269/903

(58) Field of Search ...................... 29/762, 764, 426.5, 29/426.6, 837, 33 M, 283, 251, 721, 605; 140/147; 269/903

(56) References Cited

U.S. PATENT DOCUMENTS 3,872,567 A * 3/1975 Cea et al. ..................... 29/721
4,328,613 A * 5/1982 Kirkpatrick .................. 29/837
4,485,958 A * 12/1984 Lipkes ........................ 29/764
4,727,912 A * 3/1988 Gonzalez .................... 140/147
4,789,346 A * 12/1988 Frantz ......................... 439/80
5,351,391 A * 10/1994 Doutrich et al. .............. 29/764
5,412,862 A * 5/1995 Comerci et al. ........... 29/33 M
5,778,527 A * 7/1998 Barenboim et al. ........... 29/837

FOREIGN PATENT DOCUMENTS

DE G 94 14 371.4 3/1995

OTHER PUBLICATIONS

Murko et al, Module Removal Tool, IBM Technical Disclosure Bulletin, vol. 20, No. 11A, p. 4305, Apr. 1978.*
"Removal Support Tool for Compliant Pin Connectors", IBM Technical Disclosure Bulletin, vol. 39, No. 11 Nov. 1996, pp. 33–35.
Belgian Search Report.

* cited by examiner

*Primary Examiner*—Peter Vo
*Assistant Examiner*—A. Dexter Tugbang
(74) *Attorney, Agent, or Firm*—Perman & Green, LLP

(57) ABSTRACT

For the removal of a connector from a printed circuit board (12, 28) wherein the connector consist of a connector housing (14) including contact pins (16) being of the right angle type (bent at an angle of about 90°), whereby a portion of the contact pins include a compliant attachment (press-fit) area by means of which the connector is attached to the board, and wherein use is generally made of a press with a push ram (10) and a table (11) provided with an anvil, whereby the anvil (20) comprises a base portion (22) and an upper hook-shaped portion which is formed as a comb (24) wherein the openings or slots (26) are in register with the position of the contact pins (16) along the longitudinal direction of the connector (14) and which is introduced into an open side of the connector housing up to the level of the contact pins in order to provide appropriate support to the printed circuit board while the compliant attachment area's of the contact pins are being pushed out of the holes of the board.

4 Claims, 2 Drawing Sheets

APPARATUS FOR REMOVING A CONNECTOR FROM A PRINTED CIRCUIT BOARD

BACKGROUND OF THE INVENTION

The invention relates to an apparatus and a method for removing a connector from a printed circuit board, and more specifically a connector of the type which includes contact pins of the right angle type (bent at an angle of about 90°), e.g. those of the type known under the name "Millipacs".

Such type of connectors is provided with contact pins which are attached to the printed circuit board by means of a compliant attachment area also called "press-fit" zone.

Whereas it is comparatively easy to push a connector with straight pins out of the board by means of a press, such is not the case with contact pins which are bent at an angle of 90°, since in this instance side forces are exerted in relation to the direction of the thrust.

Up to now, it was very difficult and even impossible, to remove such connectors from a printed circuit board when they had to be replaced, without damaging the metal plating of the holes in the PC board.

Considering that the printed circuit boards are essentially more expensive than the connectors, it is important that a repair should be able to be carried out without damaging the board.

SUMMARY OF THE INVENTION

An object of the present invention is to provide an apparatus and a method which make is possible to remove a connector with contact pins which are bent at an angle of about 90° from a printed circuit board without damaging the holes and the surface of such board.

This object is achieved by means of the invention, the most important features of which are set out in the attached claims.

BRIEF DESCRIPTION OF THE DRAWINGS

The details of the present invention are further explained by means of the following description of an embodiment thereof, with reference to the enclosed drawings, wherein.

DETAILED DESCRIPTION OF THE INVENTION

Figure 1:
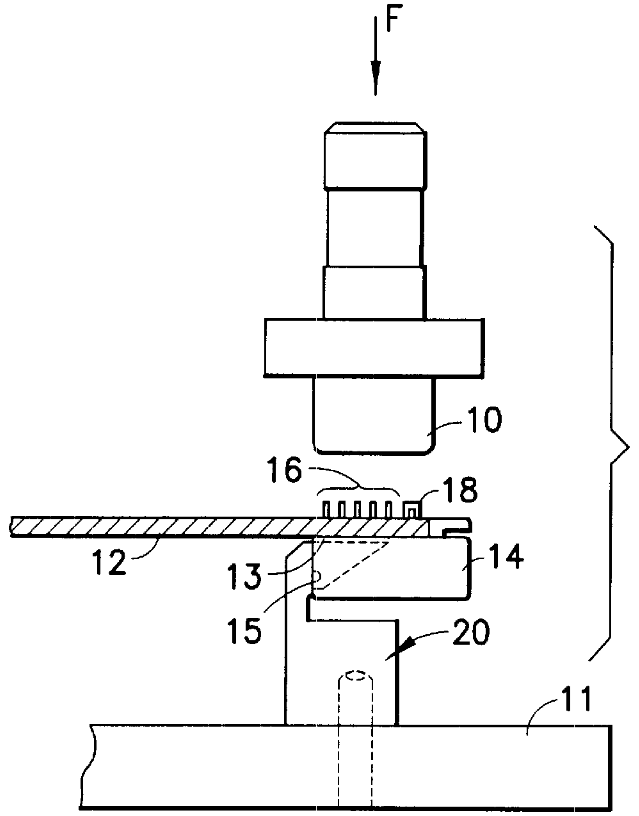
FIG. 1 is a schematic representation of all the parts related to the extraction of a connector out of a printed board.

FIG. 1 illustrates the push ram 10 and the table 11 of a press. The printed circuit board 12 with the connector 14 to be removed and replaced is positioned between the push ram 10 and the table, with the connector housing positioned on the lower side and the compliant attachment pins on the upper side of the PC board 12.

The contact pins 16 are attached to the printed board 12 by means of their compliant attachment area, and their ends project above the printed board 12, together with grounding or guiding pins 18. These pin ends project beyond the printed boards with normal thickness with a distance sufficient to press the connector out of the printed board 12 by means of the push ram 10.

As already mentioned above, problems arise when connectors provided with contact pins 16 which are bent at an angle of about 90° are to be pressed out of the printed board 12 without damaging the metal plating holes of the board, because of a lateral deviation of the vertical section of each contact pin.

According to the invention, use is made of a specially designed anvil 20 to support the printed circuit board 12 locally in an appropriate manner while the contact pins 16 are pressed out of the corresponding holes of the printed board 12 without the latter being damaged.

Figure 2:
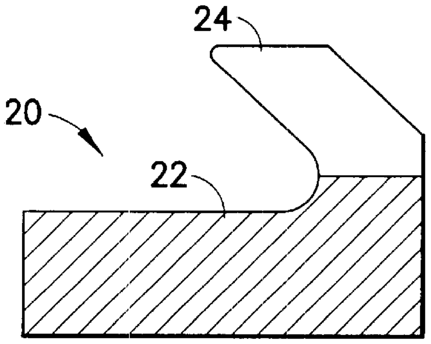
FIG. 2 is a front view of a support block according to the invention.
Figure 3:
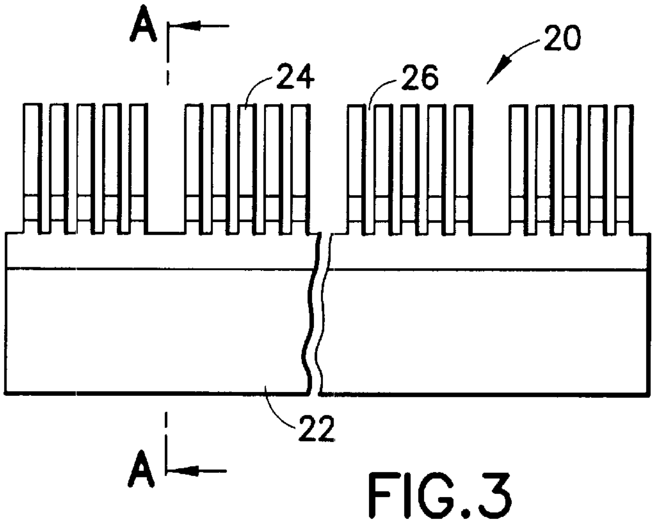
FIG. 3 is a cross section view of the support block of FIG. 2, along the line A—A of FIG. 2.

This anvil 20 is, as illustrated in further detail in FIGS. 2 and 3, formed by a base portion 22 and a hook-shaped upper portion which is formed as a comb 24, wherein the openings of slots 26 are in register with the positions of the contact pins 16 along the longitudinal direction of the connector 14.

The hook-shaped comb portion 24 is able to penetrate into corresponding openings in the rear panel 15 of the connector housing 14, between the contact pins 16, and at the same time, it is able to support the printed board 12 in the region of the vertically projecting portions during the extraction of said pins 16 by the push ram 10 of the press.

The upper side of the comb-shaped portion 24 of the anvil 20 will be positioned in the connector housing 14 under a thin bottom wall 13. An additional advantage is thereby obtained through the fact that this thin bottom wall 13 will additionally protect the surface of the printed circuit board 12 against being damaged by the comb 20.

While the connector 14 is pressed out of the printed board 12, said thin bottom 13 will obviously be torn off from the remaining portion of the connector housing 14.

Figure 4:
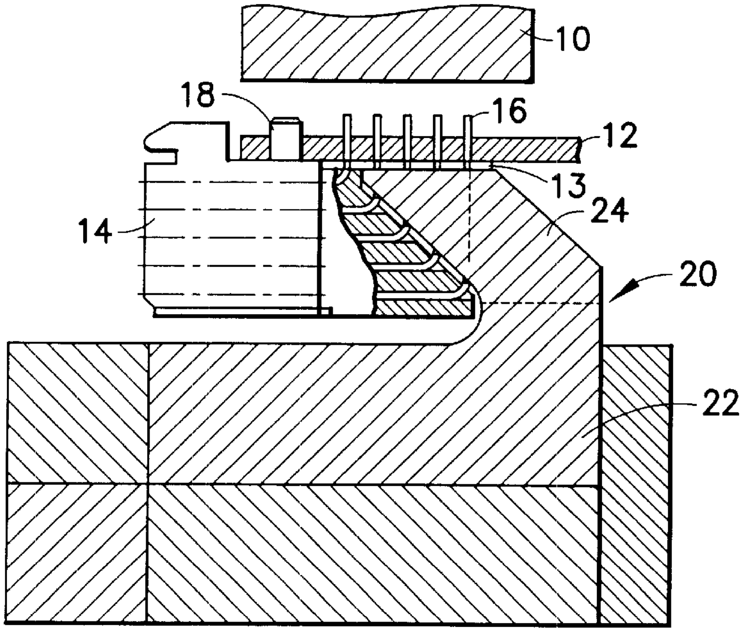
FIG. 4 is a cross section view of the support block in an operative position with a printed circuit board of normal thickness.

As more clearly illustrated in FIG. 4, the connector 14 with contact pins 16 which are bent at 90° is positioned above an anvil 20 with hook-shaped comb 24 in a state where it is ready to press the connector 14 out of the printed board 12. This is carried out by means of a downwards move of the push ram 10 (or an upwards move of the table 11, and the resulting thrust acting on the compliant attachment area of the vertically projecting pins 16 of the connector 14.

The thin bottom wall 13 of the connector housing will thereby remain clamped between the comb 24 and the PC board 12, until the connector 14 has been pressed out of the board.

Figure 5:
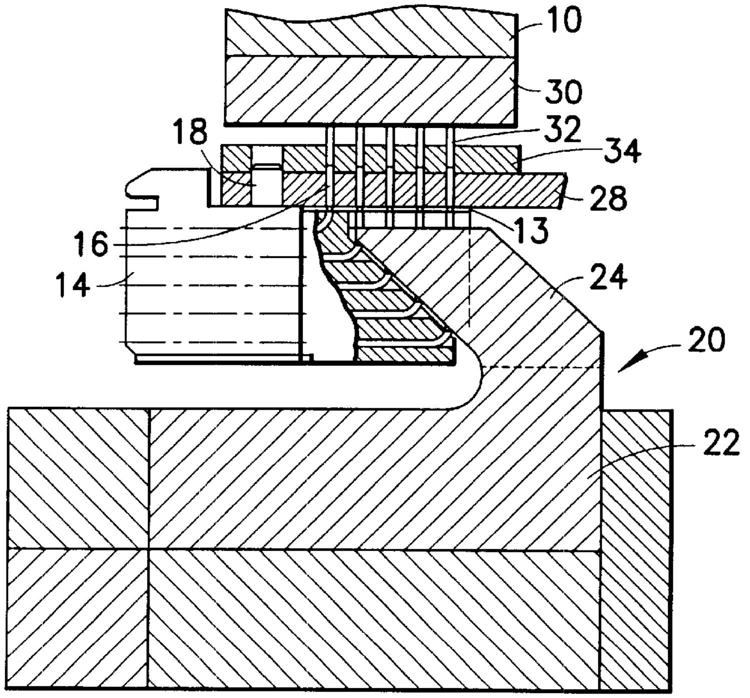
FIG. 5 is a cross section view of the support block in an operative position with a thick printed circuit board.

In case the printed board 12 should be to thick for the connector to be pressed out of the board solely by means of the projecting portions of the contact pins 16, adapted ancillary parts, as illustrated in FIG. 5, can be used.

A first ancillary part is constituted of an intermediate part 30 which is attached to the push ram 10 and which is provided with push-through pins 32 which are located in the same positions as the projecting portions of the contact pins 16 of the connector 14.

A second ancillary part is constituted of a guiding plate 34 which is provided with guiding holes at the locations of the contact pins 16 and of the grounding and guiding pins 18 of the connector 14.

As illustrated in FIG. 5, the comb 24 does not lie yet completely in the exact position against the bottom 13 of the connector housing 14 before the contact pins are pressed out, this being intended in order to more clearly distinguish the successive parts: comb 24, bottom wall 13, thick printed circuit board 28 with contact pins 16 bent at 90°, guiding plate 34, push-through pins 32, intermediate part 30 and push ram 10.

In such a arrangement, the guiding plate 34 will be first positioned on the ends of the contact pins 16 of the printed circuit board 28. During a downwards move of the push ram 10 provided with the intermediate part 30 with push-through pins 32, the latter will be in a first stage guided into the holes in the guiding plate 34, until the push-through pins 32 reach the contact pins 16.

Because of the thrust exerted by the push-through pins 32 on the contact pins 16, the latter will be pressed out of the printed board 28, whereby said printed board 28 is appropriately supported by the comb 24 on the anvil 20.

The invention provides the following advantages:

the connector needs not be disassembled before it is pressed out of the printed board;

due to the absence of lateral forces caused by the deformation of the bent contact pins 16, the risk that the metal plating of the holes in the PC board 12 should be damaged, is avoided;

the bottom 13 of the connector housing 14 protects the surface of the PC board 12 or 28 during the extraction;

the possibility of removing such connectors even from thick printed boards by means of adapted intermediate parts.

The above described embodiment is merely one practical example of the invention, and it goes without saying that other embodiments are possible without leaving the scoped of the present invention.

It is for example also possible that the push ram 10 remains fixed and that the table 11 is moved upwards together with the anvil 20 and the connector 14 in order to press the contact pins 16 out of the connector.

It should also be possible to give the anvil 20 another shape, it being essential that the printed board 12 is supported in the region of and between the rows of contact pins 16.

What is claimed is:

1. Apparatus in combination with a printed circuit board and a connector for removing the connector from the printed circuit board, said connector comprising a connector housing including contact pins which are bent at an angle, and wherein a portion of the contact pins include a compliant attachment or press-fit area by means of which the connector is attached to the circuit board, said apparatus comprising:

a press for removing the connector, said press comprising a push ram and an opposing table having an anvil, said anvil comprising a base portion and a hook shaped portion, said hook shaped portion being in the form of a comb having openings or slots which can be registered with the position of the contact pins of the connector along a given direction of the connector, wherein the contact pins of the connector are bent at an angle of about 90° and wherein said apparatus further includes means for providing relative motion between the push ram and the anvil so that the contact pins can be pressed out of the printed circuit board while avoiding the occurrence of lateral forces caused by deformation of the contact pins, and wherein the printed circuit board is adapted to be positioned on the anvil and wherein the anvil hook shaped portion is adapted to extend into the connector housing and between the rows of contact pins.

2. Apparatus in combination with a printed circuit board and a connector for removing the connector from the printed circuit board, said connector comprising a connector housing including contact pins which are bent at an angle, and wherein a portion of the contact pins include a compliant attachment or press-fit area by means of which the connector is attached to the circuit board, said apparatus comprising:

a press for removing the connector, said press comprising a push ram and an opposing table having an anvil, said anvil comprising a base portion and a hook shaped portion, said hook shaped portion being in the form of a comb having openings or slots which can be registered with the position of the contact pins of the connector along a given direction of the connector, wherein the contact pins of the connector are bent at an angle of about 90° and wherein said apparatus further includes means for providing relative motion between the push ram and the anvil so that the contact pins can be pressed out of the printed circuit board while avoiding the occurrence of lateral forces caused by deformation of the contact pins, wherein the printed circuit board is adapted to be positioned on the anvil, wherein the anvil hook shaped portion is adapted to extend into the connector housing and between the rows of contact pins, and wherein said openings or slots are arranged to receive the contact pins of the connector along a given direction of the connector.

3. Apparatus for removing a connector from a printed circuit board, said connector comprising a connector housing including contact pins which are bent at an angle, and wherein a portion of the contact pins include a compliant attachment or press-fit area by means of which the connector is attached to the circuit board, said apparatus comprising:

a press, said press comprising a push ram and an opposing table having an anvil, said anvil comprising a base portion and a hook shaped portion, said hook shaped portion being in the form of a comb having openings or slots which can be registered with the position of the contact pins of the connector along a given direction of the connector and wherein the push ram further includes an intermediate part having push-through pins adapted for use with a connector which has to be extracted from a thick printed circuit board.

4. Apparatus according to claim 3 further including a guiding plate adapted to be positioned on the printed circuit board, said guiding plate having guiding holes which can be registered with the positions of the contact pins, said guiding holes of said guiding plate being adapted to cooperate with the push through pins of the intermediate part.

* * * * *